United States Patent
Itoh et al.

(10) Patent No.: US 10,294,838 B2
(45) Date of Patent: May 21, 2019

(54) EXHAUST PURIFICATION FILTER (71) Applicant: Toyota Jidosha Kabushiki Kaisha, Aichi (JP)

(72) Inventors: Kazuhiro Itoh, Mishima (JP); Hiromasa Nishioka, Susono (JP); Yoshihisa Tsukamoto, Susono (JP); Daichi Imai, Suntou-gun (JP); Hiroshi Otsuki, Gotenba (JP); Ryota Koutake, Kakegawa (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 738 days.

(21) Appl. No.: 14/646,229

(22) PCT Filed: Dec. 3, 2012

(86) PCT No.: PCT/JP2012/081280
§ 371 (c)(1),
(2) Date: May 20, 2015

(87) PCT Pub. No.: WO2014/087472
PCT Pub. Date: Jun. 12, 2014

(65) Prior Publication Data
US 2015/0322832 A1 Nov. 12, 2015

(51) Int. Cl.
*B01D 46/00* (2006.01)
*B01D 46/24* (2006.01)
(Continued)

(52) U.S. Cl.
CPC ....... *F01N 3/0222* (2013.01); *B01D 46/0002* (2013.01); *B01D 46/2418* (2013.01);
(Continued)

(58) Field of Classification Search
CPC .................................................. F01N 2330/38
See application file for complete search history.

(56) References Cited

U.S. PATENT DOCUMENTS 4,718,926 A * 1/1988 Nakamoto ............ F01N 3/0222
422/180
4,740,408 A * 4/1988 Mochida ................ B01D 46/10
422/179
(Continued)

FOREIGN PATENT DOCUMENTS

| CN | 102939445 A | 2/2013 |
| CN | 104812999 A | 7/2015 |

(Continued)

OTHER PUBLICATIONS

US 2016-0138448 A1 (publication of U.S. Appl. No. 14/896,725).
Office Action in U.S. Appl. No. 14/896,725, dated Aug. 16, 2017.

*Primary Examiner* — Duane Smith
*Assistant Examiner* — Brit E. Anbacht
(74) *Attorney, Agent, or Firm* — Hauptman Ham, LLP (57) ABSTRACT

An exhaust cleaning filter has an exhaust gas inflow passage and an exhaust gas outflow passage disposed in alternating fashion; and a porous partition wall for setting the exhaust gas inflow and outflow passages at a distance from each other. A small pore region is sectioned off on the upstream side and a large pore region is sectioned off on the downstream side of the partition wall. The average pore diameter of the partition wall in the large pore region is greater than in the small pore region, and is set so that ash contained in the exhaust gas is able to pass through the partition wall. The exhaust purification filter has a promoting member for promoting the passing of exhaust gas that has flowed into the exhaust gas inflow passage, through the partition wall in the small pore region, and promoting inflow into the exhaust gas outflow passage.

10 Claims, 7 Drawing Sheets

(51) Int. Cl.
*B01J 35/04* (2006.01)
*F01N 3/022* (2006.01)
*F01N 3/035* (2006.01)

(52) U.S. Cl.
CPC .............. *B01J 35/04* (2013.01); *F01N 3/022* (2013.01); *F01N 3/035* (2013.01); *F01N 2330/06* (2013.01); *F01N 2330/30* (2013.01); *F01N 2330/38* (2013.01); *F01N 2510/0682* (2013.01)

(56) References Cited

U.S. PATENT DOCUMENTS

| | | | | |
|---|---|---|---|---|
| 5,258,349 A | * | 11/1993 | Dalla Betta | B01J 23/44 502/330 |
| 5,514,347 A | * | 5/1996 | Ohashi | B01D 53/9454 29/890 |
| 7,772,151 B2 | * | 8/2010 | Li | B01D 46/2429 502/335 |
| 8,277,743 B1 | * | 10/2012 | Ramberg | B01J 19/2485 422/129 |
| 9,255,505 B2 | | 2/2016 | Nakayama et al. | |
| 9,394,816 B2 | | 7/2016 | Nakayama et al. | |
| 9,689,296 B2 | * | 6/2017 | Nishioka | F01N 9/002 |
| 9,718,026 B2 | * | 8/2017 | Otsuki | B01D 53/94 |
| 9,790,828 B2 | * | 10/2017 | Imai | F01N 3/0222 |
| 2001/0026838 A1 | * | 10/2001 | Dettling | B01J 23/63 427/230 |
| 2002/0162325 A1 | | 11/2002 | Kato et al. | |
| 2003/0211020 A1 | | 11/2003 | Rao et al. | |
| 2004/0068971 A1 | * | 4/2004 | Kuki | B01D 46/2459 55/523 |
| 2004/0175315 A1 | * | 9/2004 | Brisley | B01D 53/9431 423/239.1 |
| 2006/0008396 A1 | | 1/2006 | Wursthorn et al. | |
| 2006/0039843 A1 | * | 2/2006 | Patchett | B01D 53/9418 423/239.1 |
| 2006/0057046 A1 | * | 3/2006 | Punke | B01D 53/944 423/215.5 |
| 2007/0114700 A1 | * | 5/2007 | Andrewlavage, Jr. | B01D 46/0001 264/400 |
| 2007/0234714 A1 | | 10/2007 | Maus et al. | |
| 2008/0241011 A1 | * | 10/2008 | Ohno | B01D 39/2093 422/180 |
| 2009/0246453 A1 | | 10/2009 | Yamaguchi | |
| 2010/0037600 A1 | * | 2/2010 | Doring | F01N 3/0222 60/297 |
| 2011/0201493 A1 | | 8/2011 | Goto et al. | |
| 2011/0252773 A1 | | 10/2011 | Arnold et al. | |
| 2012/0186229 A1 | * | 7/2012 | Phillips | B01D 53/9418 60/274 |
| 2015/0059321 A1 | * | 3/2015 | Nakayama | F01N 3/035 60/297 |
| 2015/0167518 A1 | * | 6/2015 | Nakayama | B01D 53/944 60/297 |
| 2015/0182958 A1 | * | 7/2015 | Kato | B01D 53/8631 422/180 |
| 2015/0292387 A1 | * | 10/2015 | Nishioka | F01N 9/005 422/178 |
| 2015/0298058 A1 | * | 10/2015 | Otsuki | F01N 3/035 422/180 |
| 2015/0322832 A1 | * | 11/2015 | Itoh | B01J 35/04 55/495 |
| 2016/0138448 A1 | * | 5/2016 | Itoh | F01N 3/0222 422/180 |
| 2016/0265411 A1 | * | 9/2016 | Tsukamoto | F01N 3/05 |
| 2017/0016366 A1 | * | 1/2017 | Suzawa | F01N 3/0222 |

FOREIGN PATENT DOCUMENTS

| | | |
|---|---|---|
| EP | 1974792 A1 | 10/2008 |
| EP | 2108447 A2 | 10/2009 |
| EP | 2324904 A2 | 5/2011 |
| EP | 2436889 A2 | 4/2012 |
| EP | 2502660 A1 | 9/2012 |
| JP | S61-205315 A | 9/1986 |
| JP | 2001-221038 A | 8/2001 |
| JP | 2003-154223 A | 5/2003 |
| JP | 2004-130229 A | 4/2004 |
| JP | 2004130229 A | 4/2004 |
| JP | 2004-239199 A | 8/2004 |
| JP | 2004239199 A | 8/2004 |
| JP | 2005-220848 A | 8/2005 |
| JP | 2005-305417 A | 11/2005 |
| JP | 2005305417 A | 11/2005 |
| JP | 2007021368 A | 2/2007 |
| JP | 2008-519683 A | 6/2008 |
| JP | 2009-112951 A | 5/2009 |
| JP | 2009-255055 A | 11/2009 |
| JP | 2011-038410 A | 2/2011 |
| JP | 2011104524 A | 6/2011 |
| JP | 2012077693 A | 4/2012 |
| JP | 2012117487 A | 6/2012 |
| JP | 2012206061 A | 10/2012 |
| JP | 2012-254440 A | 12/2012 |
| WO | 2002/25072 A1 | 3/2002 |
| WO | 2008126331 A1 | 10/2008 |
| WO | 2012/157420 A1 | 11/2012 |
| WO | 2013145266 A1 | 10/2013 |

* cited by examiner

FIG. 11B

EXHAUST PURIFICATION FILTER

CROSS-REFERENCE TO RELATED APPLICATION

This is a national phase application based on the PCT International Patent Application No. PCT/JP2012/081280 filed Dec. 3, 2012, the entire contents of which are incorporated herein by reference.

TECHNICAL FIELD

The present invention relates to an exhaust purification filter.

BACKGROUND ART

A compression ignition type internal combustion engine is known in the art which arranges a particulate filter for trapping particulate matter in exhaust gas inside an exhaust passage. The particulate filter is provided with alternately arranged exhaust gas inflow passages and exhaust gas outflow passages and porous partition walls which separate these exhaust gas inflow passages and exhaust gas outflow passages from each other. The downstream ends of the exhaust gas inflow passages are closed by downstream side plugs, while the upstream ends of the exhaust gas outflow passages are closed by upstream side plugs. Therefore, exhaust gas first flows into the exhaust gas inflow passages, next passes through the surrounding partition walls, and flows out to the insides of the adjoining exhaust gas outflow passages. As a result, the particulate matter in the exhaust gas is trapped on the partition walls and is suppressed from being discharged into the atmosphere.

In this regard, if the amount of the particulate matter on the particulate filter becomes greater, pressure loss of the particulate filter gradually becomes larger. As a result, engine output is liable to fall. Therefore, in this internal combustion engine, PM removal processing which maintains the particulate filter in an oxidizing atmosphere while making the temperature of the particulate filter rise is performed. Due to this, the particulate matter is burned off from the particulate filter.

In this regard, exhaust gas contains unburnable ingredients called "ash". This ash is trapped together with the particulate matter on the particulate filter. In this regard, even if PM removal processing is performed, the ash will not burn or be vaporized but will remain on the particulate filter. For this reason, as the engine operation time becomes longer, the amount of ash on the particulate filter gradually increases and the pressure loss of the particulate filter gradually becomes greater. As a result, even if the PM removal processing is repeated, the engine output is liable to decrease.

Therefore, a particulate filter is known in the art which forms through holes in the downstream side plugs to enable ash to flow out from the particulate filter through the through holes (see PLT 1). In this PLT 1, if the engine operating time becomes longer, the through holes become closed by the particulate matter. If the through holes are closed, the particulate filter can trap particulate matter in the same way as a conventional particulate filter which does not have through holes. Next, if PM removal processing is performed, the particulate matter which closed the through holes is removed and the through holes are opened. As a result, the ash on the particulate filter is discharged from the particulate filter through the through holes.

CITATIONS LIST

Patent Literature

PLT 1: Japanese Patent Publication No. 2004-130229A

SUMMARY OF INVENTION

Technical Problem

However, in PLT 1, in the period from the start of engine operation or the end of PM removal processing to when the through holes are closed, particulate matter ends up flowing out from the particulate filter through the through holes. Further, in PLT 1, the diameter of the through holes is set to 0.2 mm or more. It takes a considerably long time until through holes of such a large diameter are closed by particulate matter. This means that the amount of particulate matter which flows out from the particulate filter through the through holes is considerably large.

An object of the present invention is to provide an exhaust purification filter which can reliably trap particulate matter while suppressing the pressure loss of the exhaust purification filter from increasing due to the ash.

Solution to Problem

According to the present invention, there is provided an exhaust purification filter, adapted to be arranged in an exhaust passage in an internal combustion engine, for trapping particulate matter which is contained in exhaust gas, in which the exhaust purification filter is provided with alternately arranged exhaust gas inflow passages and exhaust gas outflow passages and porous partition walls which separate these exhaust gas inflow passages and exhaust gas outflow passages from each other, a fine zone is defined at an upstream side of the partition walls and a rough zone is defined at a downstream side of the partition walls, a median micropore diameter of the partition walls in the rough zone is set larger than a median micropore diameter of the partition walls in the fine zone and is set so that ash which is contained in the exhaust gas can pass through the partition walls, and promoting members are provided which promote the passage of exhaust gas which flows into the exhaust gas inflow passages through the partition walls in the fine zone and flow into the exhaust gas outflow passages.

Preferably, in the fine zone, coat layers with a median micropore diameter smaller than the median micropore diameter of substrates of the partition walls cover the surfaces of the substrates and, in the rough zone, the surfaces of the substrates of the partition walls are not covered by the coat layers. More preferably, the coat layers are provided so as to stick out from the surfaces of the substrates which face the exhaust gas inflow passages inward in the exhaust gas inflow passages and wherein the promoting members are comprised of the coat layers. Still more preferably, the coat layers are provided with recesses.

Preferably, in the fine zone, the promoting members are provided with wall members which extend through the insides of the exhaust gas inflow passages along the partition walls.

Preferably, in the fine zone, the promoting members are provided with guide members which guide exhaust gas in exhaust gas inflow passages toward the partition walls.

Preferably, the promoting members are provided with orifices which are arranged at inlets of the exhaust gas inflow passages.

Advantageous Effects of Invention

The particulate matter can be reliably trapped while the pressure loss of the exhaust purification filter can be suppressed from increasing due to the ash.

DESCRIPTION OF EMBODIMENTS

Figure 1:
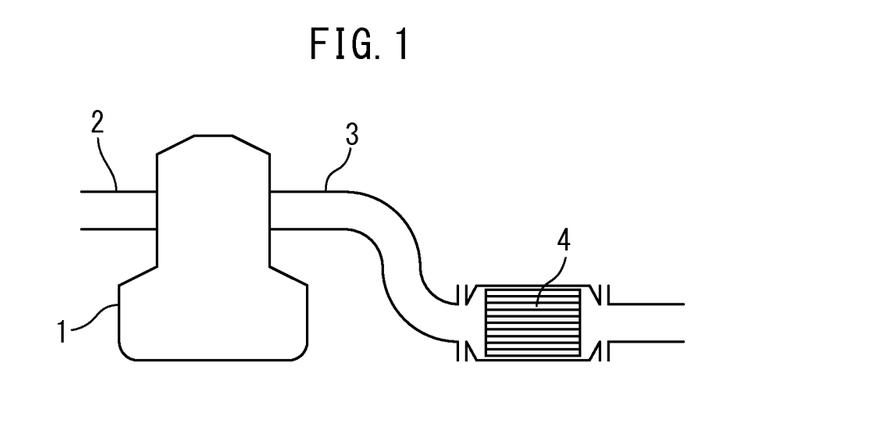
FIG. 1 is an overview of an internal combustion engine of an embodiment according to the present invention.

Referring to FIG. 1, 1 indicates a body of an internal combustion engine, 2 an intake passage, 3 an exhaust passage, and 4 an exhaust purification filter which is arranged inside the exhaust passage 3. In the embodiment which is shown in FIG. 1, the exhaust purification filter 4 is comprised of a wall-flow type particulate filter. Further, in the embodiment which is shown in FIG. 1, the internal combustion engine is comprised of a compression ignition type internal combustion engine. In another embodiment, it is comprised of a spark ignition type internal combustion engine.

Figure 2A:
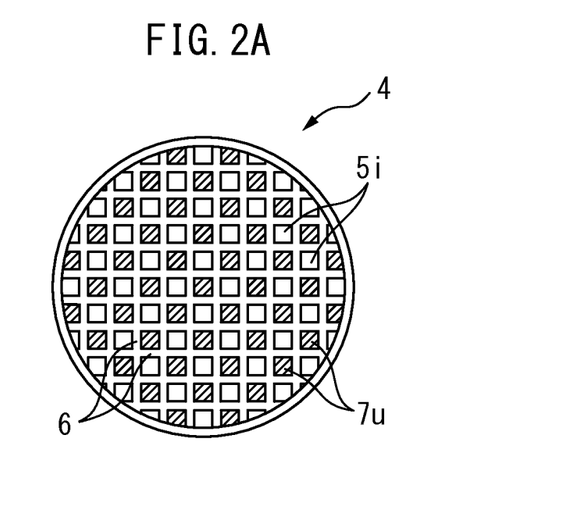
FIG. 2A is a front view of a particulate filter.
Figure 2B:
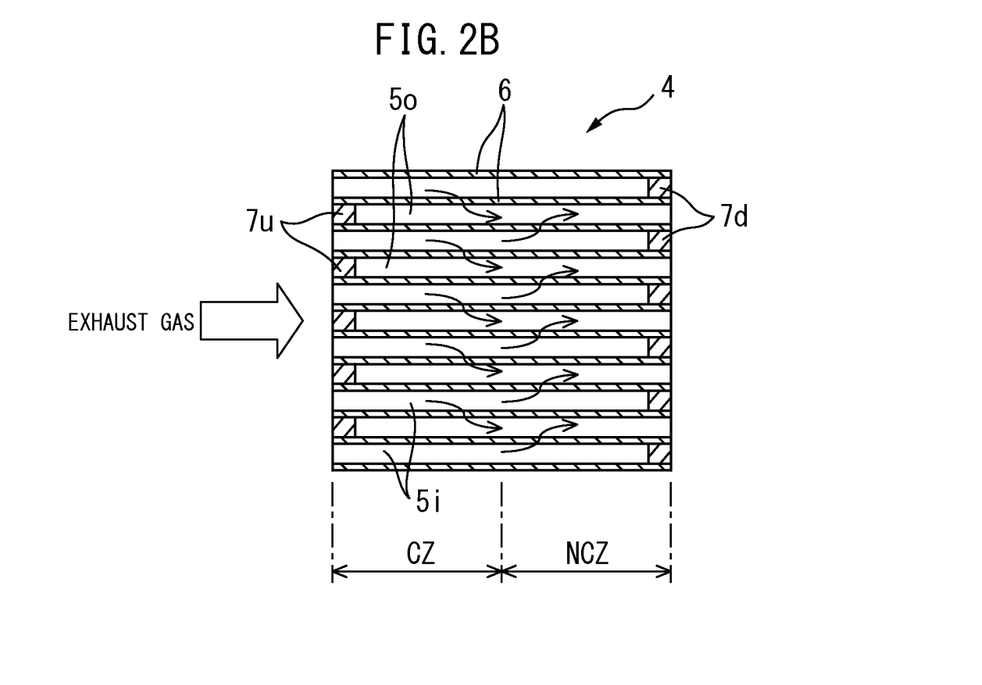
FIG. 2B is a side cross-sectional view of a particulate filter.

FIG. 2A and FIG. 2B show the structure of the particulate filter 4. Note that, FIG. 2A is a front view of the particulate filter 4, while FIG. 2B is a side cross-sectional view of the particulate filter 4. As shown in FIG. 2A and FIG. 2B, the particulate filter 4 forms a honeycomb structure which is provided with a plurality of exhaust flow passages $5i$, $5o$ which extend in parallel with each other and partition walls 6 which separate these exhaust flow passages $5i$, $5o$ from each other. In the embodiment which is shown in FIG. 2A, the exhaust flow paths $5i$ and $5o$ are comprised of exhaust gas inflow passages $5i$ with upstream ends which are open and with downstream ends which are closed by plugs $7d$ and exhaust gas outflow passages $5o$ with upstream ends which are closed by plugs $7u$ and with downstream ends which are open. Note that the hatched parts in FIG. 2A show the plugs $7u$. Therefore, the exhaust gas inflow passages $5i$ and exhaust gas outflow passages $5o$ are alternately arranged via thin partition walls 6. In other words, in the exhaust gas inflow passages $5i$ and exhaust gas outflow passages $5o$, each exhaust gas inflow passage $5i$ is surrounded by four exhaust gas outflow passages $5o$ and each exhaust gas outflow passage $5o$ is surrounded by four exhaust gas inflow passages $5i$. In another embodiment, the exhaust flow path is comprised of exhaust gas inflow passages with upstream ends and downstream ends which are open and exhaust gas outflow passages with upstream ends which are closed by plugs and with downstream ends which are open.

Figure 3:
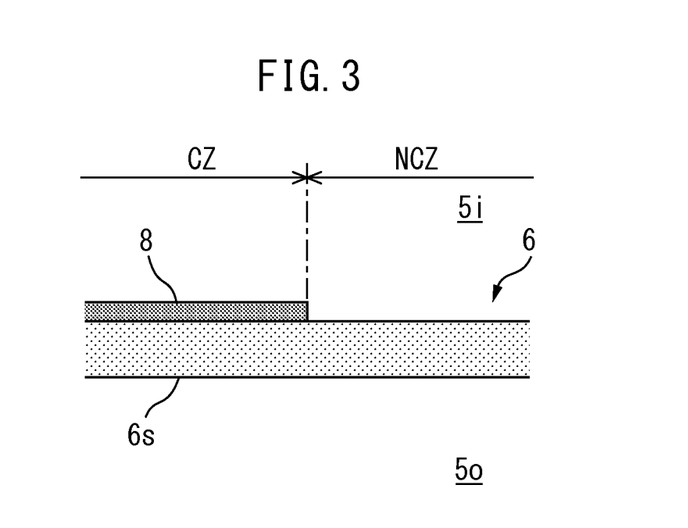
FIG. 3 is a partial enlarged cross-sectional view of a partition wall.

As shown in FIG. 2B, at the partition walls 6, a coated zone CZ and a noncoated zone NCZ which is positioned at the downstream side of the coated zone CZ are defined. As shown in FIG. 3, in the coated zone CZ, a surface of a substrate $6s$ of the partition wall 6 is covered by a coat layer 8. As opposed to this, in the noncoated zone NCZ, the surface of the partition wall substrate $6s$ is not covered by the above-mentioned coat layer 8.

Figure 4:
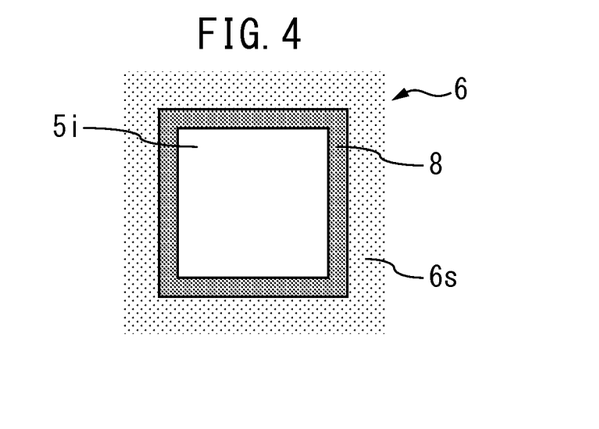
FIG. 4 is a partial enlarged cross-sectional view of an exhaust gas inlet side of a particulate filter.

As shown in FIG. 3 and FIG. 4, the coat layer 8 is provided so as to stick out from the surface of the partition wall substrate $6s$ which faces the exhaust gas inflow passage $5i$ inward in the exhaust gas inflow passage $5i$.

In the embodiment which is shown in FIG. 2B, the upstream edge of the coated zone CZ substantially matches the upstream ends of the partition walls 6. In another embodiment, the upstream edge of the coated zone CZ is positioned at the downstream side from the upstream ends of the partition walls 6. Further, in the embodiment which is shown in FIG. 2B, the downstream edge of the noncoated zone NCZ substantially matches with the downstream ends of the partition walls 6. In another embodiment, the downstream edge of the noncoated zone NCZ is positioned at the upstream side from the downstream ends of the partition walls 6. The longitudinal length of the coated zone CZ is set to, for example, 50% to 90% of the longitudinal length of the particulate filter 4.

The partition wall substrates $6s$ are formed from a porous material such as cordierite, silicon carbide, silicon nitride, zirconia, titania, alumina, silica, mullite, lithium aluminum silicate, zirconium phosphate, and other such ceramics.

Figure 5:
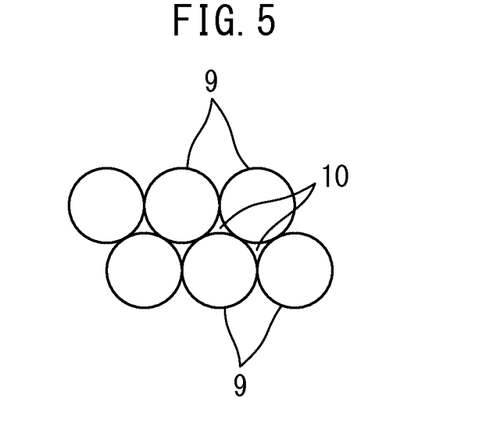
FIG. 5 is a partial enlarged cross-sectional view of a coat layer.

On the other hand, the coat layers 8, as shown in FIG. 5, are formed from large numbers of particles 9. Between the particles 9, there are large numbers of gaps or micropores 10. Therefore, the coat layers 8 have porosity. Therefore, as shown in FIG. 2B by the arrows, the exhaust gas first flows into the exhaust gas inflow passages $5i$, next passes through the surrounding partition walls 6, and flows out to the inside of the adjoining exhaust gas outflow passages $5o$.

In the embodiment which is shown in FIG. 5, the particles 9 are comprised of a metal having an oxidation function. As the metal which has an oxidation function, platinum Pt, rhodium Rh, palladium Pd, and other such platinum group metals and copper Cu, iron Fe, silver Ag, cesium Cs, and other such metals may be used. In another embodiment, the particles 9 are comprised of ceramic the same as the partition wall substrates 6s. Furthermore, in another embodiment, the particles 9 are comprised of one or both of a ceramic and metal.

The median micropore diameter of the partition wall substrates 6s is set to 25 μm to 100 μm. The fact that if the median micropore diameter of the partition wall substrates 6s is 25 μm or more, the majority of the ash which is contained in the exhaust gas can pass through the partition walls 6 is confirmed by the inventors. Therefore, in other words, in the noncoated zone NCZ, the micropore diameter of the partition walls 6 is set so that the ash which is contained in the exhaust gas passes through the partition walls 6. Note that, if considering the fact that the median particle size of the particulate matter is smaller than the median particle size of the ash, it may also be interpreted that the micropore diameter of the partition walls 6 is set in the noncoated zone NCZ so that particulate matter and ash can pass through the partition walls 6.

The median micropore diameter of the coat layers 8 is set smaller than the median micropore diameter of the partition wall substrates 6s. Specifically, the median micropore diameter of the coat layers 8 is set that the coat layers 8 can trap particulate matter which is contained in the exhaust gas. Furthermore, the median diameter of the particles 9 (secondary particles) is set to 1 μm to 10 μm. If the median diameter of the particles 9 is smaller than 1 μm, the amount of the particulate matter which passes through the coat layers 8 becomes larger than the allowable amount. Further, if the median diameter of the particles 9 is larger than 10 μm, the pressure loss of the particulate filter 4 or coat layers 8 becomes larger than the allowable value.

Therefore, in the embodiment according to the present invention, a fine zone is defined at the upstream side of the partition walls 6 and a rough zone is defined at the downstream side of the partition walls 6. The median micropore diameter of the partition walls 6 in the rough zone is set larger than the median micropore diameter of the partition walls 6 at the fine zone and is set so that the ash which is contained in the exhaust gas can pass through the partition walls 6. On top of this, in the embodiment which is shown in FIG. 2 and FIG. 3, the fine zone is comprised of the coated zone CZ, while the rough zone is comprised of the noncoated zone NCZ.

Note that, in the embodiment according to the present invention, the "median diameter of the micropores of the partition wall substrates" means the median diameter (50% diameter) of the distribution of micropore diameters which is obtained by the mercury penetration method, while the median diameter of the particles means the median diameter (50% diameter) of the distribution of particle size based on volume which is obtained by the laser diffraction and scattering method.

Now, exhaust gas contains particulate matter which is formed mainly from solid carbon. This particulate matter is trapped on the particulate filter 4.

Further, exhaust gas contains ash. This ash is also trapped by the particulate filter 4 together with the particulate matter. The fact that this ash is formed mainly from calcium sulfate $CaSO_4$, calcium zinc phosphate $Ca_{19}Zn_2(PO_4)_{14}$, and other calcium salts is confirmed by the inventors. Calcium Ca, zinc Zn, phosphorus P, etc. are derived from the engine lubricating oil, while sulfur S is derived from the fuel. That is, explaining calcium sulfate $CaSO_4$ as an example, engine lubricating oil flows into a combustion chamber 2 and calcium Ca in the lubricating oil bonds with the sulfur S in the fuel whereby calcium sulfate $CaSO_4$ is produced.

According to the inventors, it is confirmed that when a conventional particulate filter with a median micropore diameter of 10 μm to 25 μm or so not provided with a coat layer 8, in other words, a particulate filter through which almost no ash can pass, is arranged in the engine exhaust passage, the particulate matter tends to build up at the upstream side parts of the partition walls 6 rather than the downstream side parts of the partition walls 6 and the ash tends to build up at the downstream side parts of the partition walls 6 rather than the upstream side parts of the partition walls 6.

Figure 6:
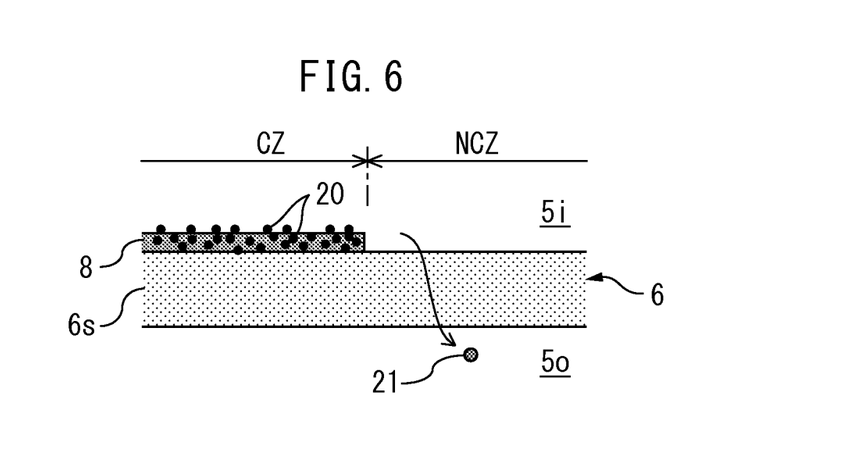
FIG. 6 is a schematic view which explains an action of a particulate filter.

Therefore, in the embodiment according to the present invention, a coated zone CZ is provided at an upstream side of the partition walls 6 while a noncoated zone NCZ is provided at the downstream side of the partition walls 6. As a result, as shown in FIG. 6, the particulate matter 20 is trapped at the partition walls 6 at the upstream side coated zone CZ and the ash 21 passes through the partition walls 6 at the downstream side noncoated zone NCZ. Therefore, the particulate matter can be suppressed from passing through the particulate filter 4 while ash can be suppressed from depositing on the particulate filter 4. In other words, the particulate matter can be reliably trapped while the pressure loss of the particulate filter 4 can be suppressed from increasing due to the ash.

Note that, in the embodiment which is shown in FIG. 1, PM removal processing is performed to remove the particulate matter from the particulate filter 4 each time the amount of particulate matter which is trapped on the particulate filter 4 becomes greater than an upper limit amount. In the PM removal processing, for example, the particulate filter is maintained in an oxidizing atmosphere while the temperature of the particulate filter is raised. Due to this, the particulate matter is burned.

In this regard, if the particulate matter reaches the noncoated zone NCZ without being trapped at the partition walls 6 in the coated zone CZ, the particulate matter passes the partition walls 6 at the noncoated zone NCZ and ends up being discharged into the atmosphere.

On this point, in the embodiment which is shown in FIG. 3 and FIG. 4, as explained above, the coat layers 8 are provided so as to stick out from the surfaces of the partition wall substrates 6s which face the exhaust gas inflow passages 5i inward in the exhaust gas inflow passages 5i. For this reason, compared to when the coat layers 8 are not provided or when the thickness of the coat layers 8 is considerably small, the exhaust gas which flows inside the exhaust gas inflow passages 5i is suppressed from proceeding in the longitudinal axial direction of the exhaust gas inflow passages 5i. Alternatively, the flow resistance of the exhaust gas inflow passages 5i in the longitudinal axial direction is raised by the coat layers 8. As a result, passage of the exhaust gas in the exhaust gas inflow passages 5i through the partition walls 6 in the coated zone CZ and flow into the exhaust gas outflow passages 5o is promoted. Therefore, the particulate matter is suppressed from passing through the partition walls 6 in the noncoated zone NCZ.

Therefore, the particulate filter 4 can be said to be provided with promoting members which promote the passage of the exhaust gas which flows into the exhaust gas inflow passages 5i through the partition walls 6 in the fine zone and flow into the exhaust gas outflow passages 5o. On top of this, in the embodiment which is shown in FIG. 3 and FIG. 4, the promoting members are comprised of the coat layers 8.

Note that, in the example which is shown in FIG. 3 and FIG. 4, the coat layers 8 are provided at the single surfaces of the partition wall substrates 6s which face the exhaust gas inflow passages 5i and are not provided at the surfaces of the partition wall substrates 6s which face the exhaust gas outflow passages 5o. In another embodiment, the coat layers 8 are provided at the two surfaces of the partition wall substrates 6s which face the exhaust gas inflow passages 5i and exhaust gas outflow passages 5o.

Figure 7:
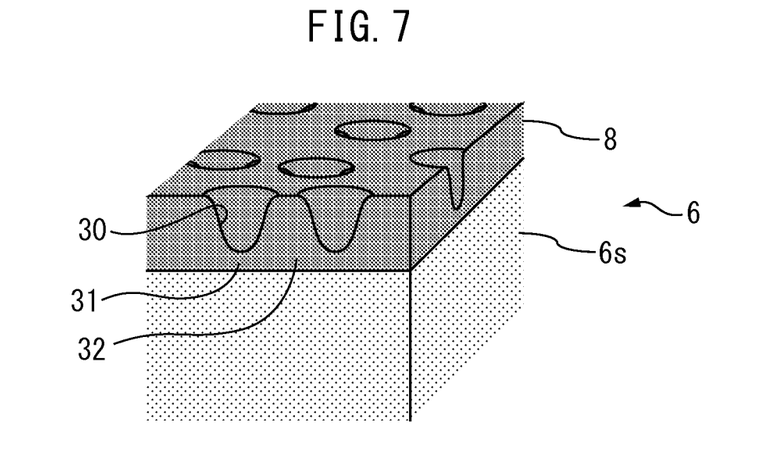
FIG. 7 is a partial enlarged cross-sectional schematic view of a partition wall which shows another embodiment according to the present invention.

FIG. 7 shows another embodiment according to the present invention. Below, the points of difference from the embodiment which is shown in FIG. 3 and FIG. 4 will be explained.

In the example which is shown in FIG. 7, the coat layers 8 which form the promoting members are provided with recesses 30. For this reason, the thickness of the coat layers 8 in the recesses 30 becomes smaller and the flow resistance in the thickness direction of the partition walls 6 in the recesses 30 becomes smaller. As a result, compared with the embodiment of, for example, FIG. 3 where no recesses 30 are provided, the flow resistance in the thickness direction of the partition walls 6 is small. Therefore, passage of the exhaust gas which flows into the exhaust gas inflow passages 5i through the partition walls 7 at the coated zone CZ and flow into the exhaust gas outflow passages 5o is promoted. Note that, the diameter of the openings of the recesses 30 is larger than the micropore diameter of the coat layers 8.

The recesses 30 are, for example, formed as follows: That is, a surface opening agent such as a foam agent is mixed with the slurry which forms the coat layers 8 and is coated together with the slurry on the substrates. Next, the substrates are baked. At this time, the foam agent foams and therefore the coat layers 8 are formed with recesses 30.

Figure 8A:
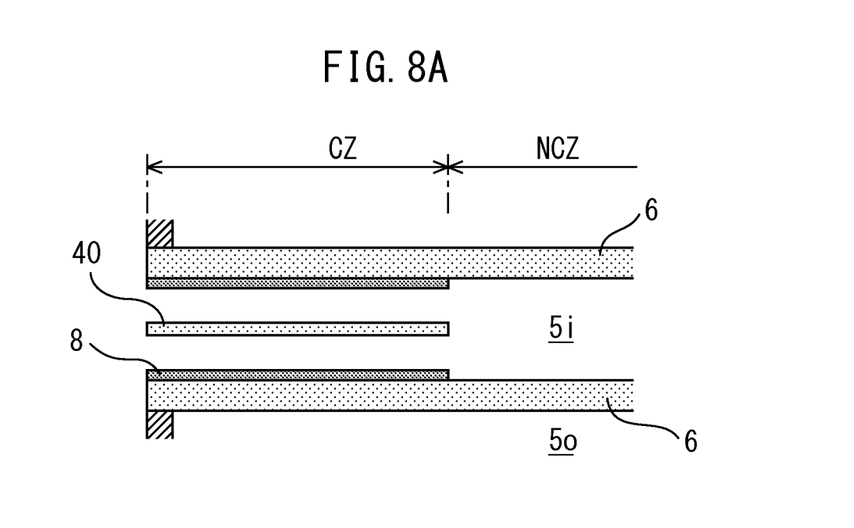
FIG. 8A is a partial enlarged cross-sectional view of a particulate filter which shows still another embodiment according to the present invention.
Figure 8B:
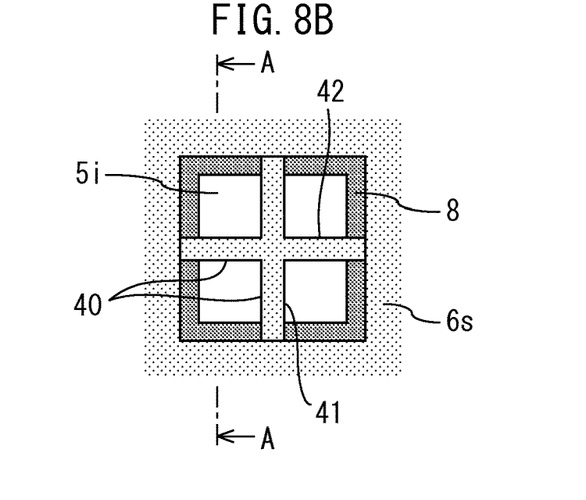
FIG. 8B is a partial enlarged cross-sectional view of an exhaust gas inlet side of the particulate filter in the embodiment which is shown in FIG. 8A.

FIG. 8A and FIG. 8B show still another embodiment according to the present invention. Note that, FIG. 8A is a cross-sectional view along the line A-A of FIG. 8B. Below, the points of difference from the embodiment which is shown in FIG. 3 and FIG. 4 will be explained.

In the example which is shown in FIG. 8A and FIG. 8B, the promoting members are provided with wall members 40 which extend in the exhaust gas inflow passages 5i along the partition walls 6, in the coated zone CZ. As will be understood from FIG. 8B, the wall members 40 have parts 41 which extend in the vertical direction and parts 42 which extend in the horizontal direction. As a result, the flow resistance of the exhaust gas inflow passages 5i in the longitudinal axial direction is raised by the wall members 40, and the exhaust gas which flows into the exhaust gas inflow passages 5i is suppressed from advancing in the longitudinal axial direction of the exhaust gas inflow passages 5i. As a result, the exhaust gas in the exhaust gas inflow passages 5i passes through the partition walls 6 in the coated zone CZ and flows out to the exhaust gas outflow passages 5o. Note that, in another embodiment, the wall members 40 have only one of the parts 41 and 42.

The wall members 40 are formed from, for example, a porous material in the same way as the partition wall substrates 6s. In another embodiment, the wall members 40 carry a catalyst.

In the embodiment which is shown in FIG. 8A and FIG. 8B, the wall members 40 are provided only in the coated zone CZ. In another embodiment, the wall members 40 are provided only at the noncoated zone NCZ. Furthermore, in another embodiment, the wall members 40 are provided at both the coated zone CZ and noncoated zone NCZ.

Further, in the embodiment which is shown in FIG. 8A and FIG. 8B, the coat layers 8 are provided at the surfaces of the partition wall substrates 6s which face the exhaust gas inflow passages 5i and are not provided at the surfaces of the partition wall substrates 6s which faces the exhaust gas outflow passages 5o. In another embodiment, the coat layers 8 are provided at both surfaces of the partition wall substrates 6s which face the exhaust gas inflow passages 5i and exhaust gas outflow passages 5o. In this case, the promoting members are provided with coat layers 8 and wall members 40. Furthermore, in another embodiment, the coat layers 8 are provided at single surfaces of the partition wall substrates 6s which face the exhaust gas outflow passages 5o and are not provided at the surfaces of the partition wall substrates 6s which face the exhaust gas inflow passages 5i. In this case, the promoting members are not provided with the coat layers 8.

Figure 9A:
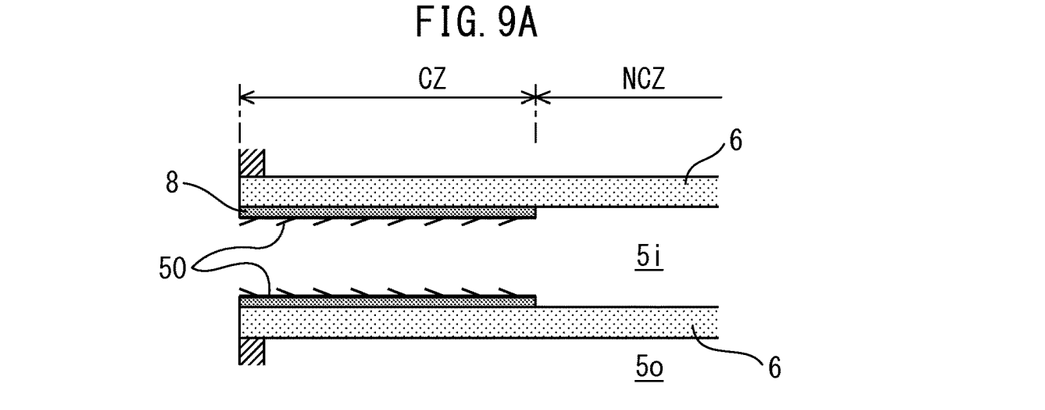
FIG. 9A is a partial enlarged cross-sectional view of a particulate filter which shows still another embodiment according to the present invention.
Figure 9B:
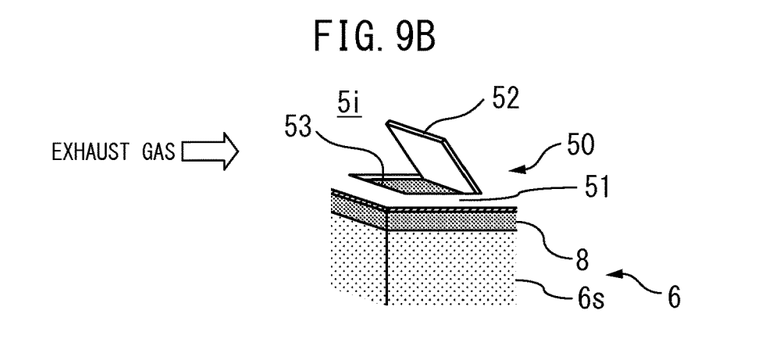
FIG. 9B is a partial enlarged cross-sectional view of a particulate filter in the embodiment which is shown in FIG. 9A.

FIG. 9A and FIG. 9B shows still another embodiment according to the present invention. Below, the points of difference from the embodiment which is shown in FIG. 8A and FIG. 8B will be explained.

In the example which is shown in FIG. 9A and FIG. 9B, in the coated zone CZ, the promoting members are provided with guide members 50 which guide exhaust gas in the exhaust gas inflow passages 5i toward the partition walls 6. The guide members 50, as shown in FIG. 9B, are provided with plate-shaped base parts 51 which are provided inside the exhaust gas inflow passages 5i and extend over the surfaces of the coat layers 8, guide pieces 52 which rise up from the base parts 51, and communicating holes 53 which are formed in the base parts 51 and communicate the exhaust gas inflow passages 5i and partition walls 6 or coat layers 8. As a result, the exhaust gas which flows into the exhaust gas inflow passages 5i strikes guide pieces 52, proceeds along the guide pieces 52, and pass through holes 53 to reach the partition walls 6 or coat layers 8. In this way, in the coated zone CZ, passage of exhaust gas through the partition walls 6 is promoted. Note that, in the example which is shown in FIG. 9A and FIG. 9B, the guide members 50 are provided in the noncoated zone NCZ.

Figure 10A:
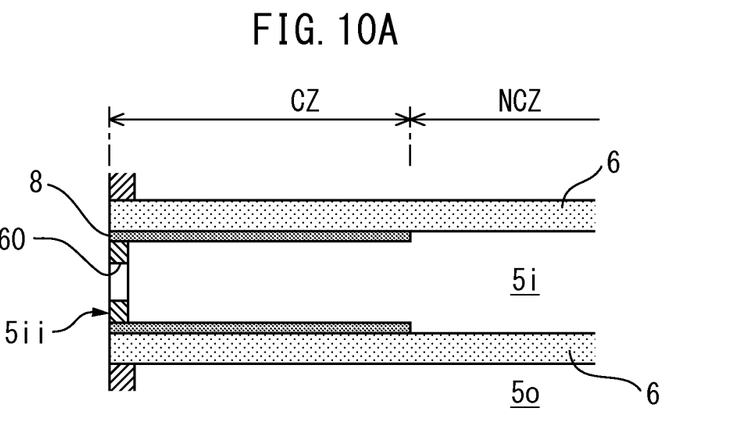
FIG. 10A is a partial enlarged cross-sectional view of a particulate filter which shows still another embodiment according to the present invention.
Figure 10B:
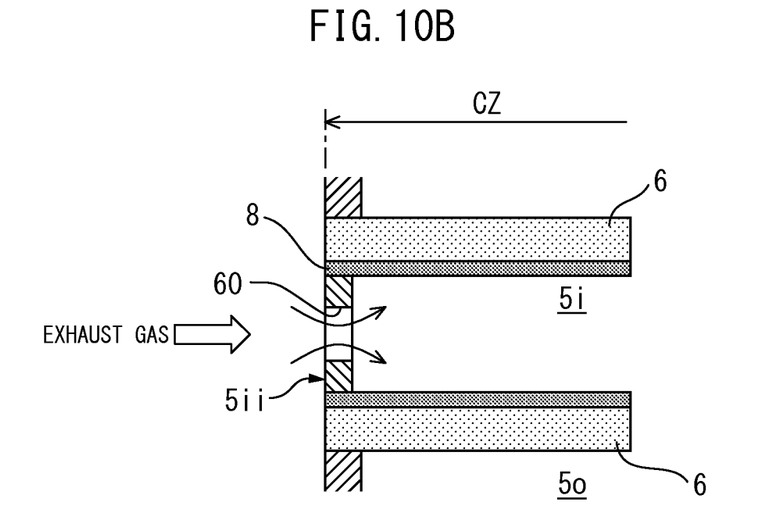
FIG. 10B is a view which explains the flow of exhaust gas in the embodiment which is shown in FIG. 10A.

FIG. 10A and FIG. 10B show still another embodiment according to the present invention. Below, the points of difference from the embodiment which is shown in FIG. 8A and FIG. 8B will be explained.

In the example which is shown in FIG. 10A and FIG. 10B, the promoting members are provided with orifices 60 which are arranged at inlets 5ii of the exhaust gas inflow passages 5i. As a result, as shown in FIG. 10B by the arrows, the exhaust gas which passes through the orifices 60 proceeds through the insides of the exhaust gas inflow passages 5i while spreading outward in the radial direction. As a result, in the coated zone CZ, passage of the exhaust gas through the partition walls 6 is promoted.

In the embodiments according to the present invention explained up to here, the noncoated zone NCZ is not provided with the coat layers. In another embodiment, the noncoated zone NCZ is provided with other coat layers which are different from the coat layers 8. In this case, the median micropore diameter of the partition walls 6 in the noncoated zone NCZ is set at 25 μm to 100 μm in the state where the other coat layers are provided. The other coat layers are formed from, for example, catalytic coat layers which carry a metal which has an oxidation function. As a result, it is possible to easily remove by oxidation the particulate matter which reaches the noncoated zone NCZ.

Figure 11A:
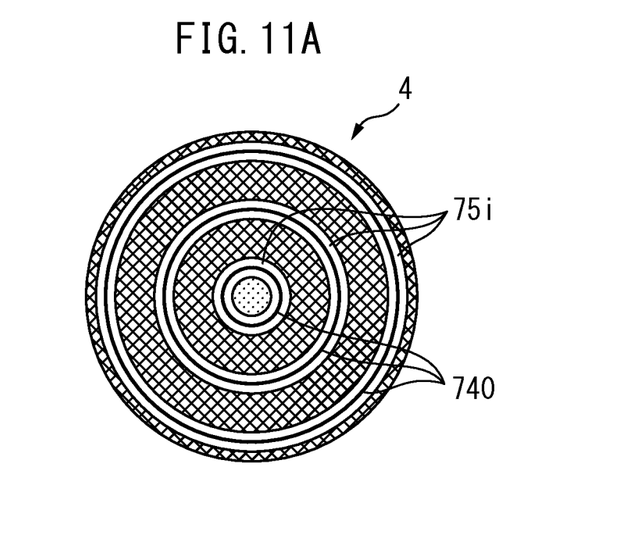
FIG. 11A is a front view of a particulate filter which shows still another embodiment according to the present invention.
Figure 11B:
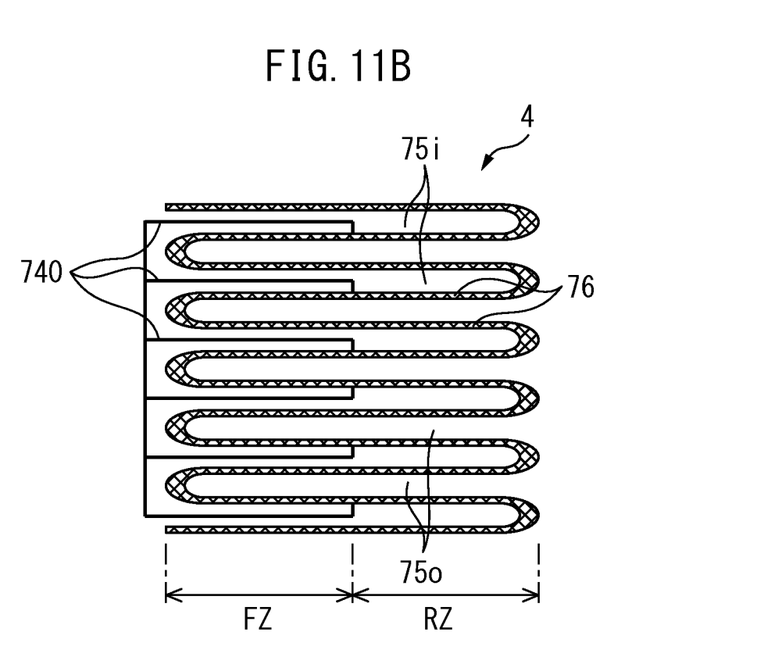
FIG. 11B is a side cross-sectional view of a particulate filter in the embodiment which is shown in FIG. 11A.

FIG. 11A and FIG. 11B show still another embodiment according to the present invention. Below, the points of difference from the embodiment which is shown in FIG. 2A to FIG. 4 will be explained.

In the example which is shown in FIG. 11A and FIG. 11B, the particulate filter 4 is formed from a single sheet of nonwoven fabric. This nonwoven fabric is folded in concentric shapes. Between the fold parts of the nonwoven fabric, concentric exhaust gas inflow passages 75i and exhaust gas outflow passages 75o are formed. These exhaust gas inflow passages 75o and exhaust gas outflow passages 75o are separated from each other by partition walls 76 which are formed from the concentric parts of the nonwoven fabric. The nonwoven fabric is formed from, for example, metal fibers and therefore has porosity. As a result, the exhaust gas first flows into the exhaust gas inflow passages 75o and then passes through the partition walls 76 and flows into the exhaust gas outflow passages 75o.

Further, the partition walls 76 are divided into a fine zone FZ and a rough zone RZ which is positioned at the downstream side of the fine zone FZ. The micropore diameter of the nonwoven fabric parts or partition walls 76 at the rough zone RZ is set so that the ash can pass through the partition walls 76. On the other hand, the micropore diameter of the nonwoven fabric parts or partition walls 76 at the fine zone FZ is set smaller than the micropore diameter of the nonwoven fabric parts or partition walls 76 at the rough zone RZ and to be able to trap particulate matter.

Furthermore, in the example which is shown in FIG. 11A and FIG. 11B, in the fine zone FZ, the promoting members are provided with wall members 740 which extend in the exhaust gas inflow passages 75i along the partition walls 76. These wall members 740 are formed from concentrically arranged cylindrically shaped plates. The cylindrically shaped plates are formed from, for example, electric heaters for heating the particulate filter 4. As a result, in the same way as the example which is shown in FIG. 8A and FIG. 8B, passage of the exhaust gas in the exhaust gas inflow passages 75i through the partition walls 76 in the fine zone FZ and flow to the exhaust gas outflow passages 75o is promoted.

Note that, in another embodiment, the micropore diameter of the nonwoven fabric parts or partition walls 76 is made substantially constant over the fine zone FZ and rough zone RZ as a whole. On top of this, the above-mentioned coat layers 8 are provided on the nonwoven fabric parts or partition walls 76 in the fine zone FZ. The coat layers 8 are not provided on the nonwoven fabric parts or partition walls 76 in the rough zone RZ.

In the embodiments according to the present invention which were explained up to here, the promoting members comprise one or two of the coat layer 8, wall member 40, guide member 50, orifice 60, and wall member 740. In another embodiment, the promoting member is provided with at least three of the coat layer 8, wall member 40, guide member 50, orifice 60, and wall member 740.

REFERENCE SIGNS LIST 1. engine body
3 exhaust passage
4 particulate filter
5i exhaust gas inflow passages
5o exhaust gas outflow passages
6 partition walls
8 coat layer
CZ coated zone
NCZ noncoated zone

The invention claimed is:

1. An exhaust purification filter, adapted to be arranged in an exhaust passage in an internal combustion engine, for trapping particulate matter which is contained in exhaust gas, wherein the exhaust purification filter is provided with alternately arranged exhaust gas inflow passages and exhaust gas outflow passages and porous partition walls which separate these exhaust gas inflow passages and exhaust gas outflow passages from each other, a fine zone is defined at an upstream side of the partition walls and a rough zone is defined at a downstream side of the partition walls, the rough zone is arranged downstream of the fine zone in a longitudinal direction of the exhaust gas inflow and outflow passages, a median micropore diameter of the partition walls in the rough zone is set larger than a median micropore diameter of the partition walls in the fine zone and is set so that ash which is contained in the exhaust gas can pass through the partition walls, and promoting members are provided which promote the passage of exhaust gas which flows into the exhaust gas inflow passages through the partition walls of the fine zone and flow into the exhaust gas outflow passages, wherein, in said fine zone, coat layers with a median micropore diameter smaller than the median micropore diameter of substrates of the partition walls cover the surfaces of the substrates and, in said rough zone, the surfaces of the substrates of the partition walls are not covered by said coat layers, and wherein said coat layers are provided so as to stick out from the surfaces of the substrates which face said exhaust gas inflow passages inward in the exhaust gas inflow passages and wherein said promoting members are comprised of said coat layers.

2. The exhaust purification filter according to claim 1 wherein said coat layers are provided with recesses.

3. The exhaust purification filter according to claim 1 wherein, in said fine zone, said promoting members are provided with wall members which extend through the insides of the exhaust gas inflow passages along the partition walls.

4. The exhaust purification filter according to claim 1, wherein, in said fine zone, said promoting members are provided with guide members which guide the exhaust gas in the exhaust gas inflow passages toward the partition walls.

5. The exhaust purification filter according to claim 1, wherein said promoting members are provided with orifices which are arranged at inlets of the exhaust gas inflow passages.

6. The exhaust purification filter according to claim 1, wherein, in said fine zone, said promoting members have guide members configured to guide the exhaust gas in the exhaust gas inflow passages toward the partition walls, said guide members extending from the coat layers inward of the exhaust gas inflow passages and also toward inlets of the exhaust gas inflow passages.

7. An exhaust purification filter, adapted to be arranged in an exhaust passage in an internal combustion engine, for trapping particulate matter contained in exhaust gas exhausted by the internal combustion engine, the exhaust purification filter comprising:

alternately arranged exhaust gas inflow passages and exhaust gas outflow passages;

porous partition walls which separate the alternately arranged exhaust gas inflow passages and exhaust gas outflow passages from each other, wherein a fine zone is defined at an upstream side of the partition walls and a rough zone is defined at a downstream side of the partition walls, and the rough zone is arranged downstream of the fine zone in a longitudinal direction of the exhaust gas inflow and outflow passages; and promoting members configured to promote the exhaust gas, which flows into the exhaust gas inflow passages, to pass through the partition walls in the fine zone and flow into the exhaust gas outflow passages, wherein the promoting members comprise porous coat layers in the fine zone, the fine zone, including the porous coat layers and the partition walls, is permeable to the exhaust gas, surfaces of the partition walls are covered by the porous coat layers in the fine zone, and are not covered by the porous coat layers in the rough zone, a median micropore diameter of the partition walls in the rough zone is set larger than a median micropore diameter of the partition walls in the fine zone, and is set so that ash contained in the exhaust gas is passable through the partition walls in the rough zone, the porous coat layers have a median micropore diameter smaller than the median micropore diameter of substrates of the partition walls, and the porous coat layers stick out from the surfaces of the partition walls, which face the exhaust gas inflow passages, inward of the exhaust gas inflow passages.

8. An exhaust purification filter, adapted to be arranged in an exhaust passage in an internal combustion engine, for trapping particulate matter contained in exhaust gas exhausted by the internal combustion engine, the exhaust purification filter comprising:

alternately arranged exhaust gas inflow passages and exhaust gas outflow passages;

porous partition walls which separate the alternately arranged exhaust gas inflow passages and exhaust gas outflow passages from each other, wherein a fine zone is defined at an upstream side of the partition walls and a rough zone is defined at a downstream side of the partition walls; and promoting members configured to promote the exhaust gas, which flows into the exhaust gas inflow passages, to pass through the partition walls in the fine zone and flow into the exhaust gas outflow passages, wherein the promoting members comprise porous coat layers in the fine zone, the fine zone, including the porous coat layers and the partition walls, is permeable to the exhaust gas, surfaces of the partition walls are covered by the porous coat layers in the fine zone, and are not covered by the porous coat layers in the rough zone, a median micropore diameter of the partition walls is set so that ash contained in the exhaust gas is passable through the partition walls in the rough zone, the porous coat layers have a median micropore diameter smaller than the median micropore diameter of the partition walls, the porous coat layers stick out from the surfaces of the partition walls, which face the exhaust gas inflow passages, inward of the exhaust gas inflow passages, and in the fine zone, the promoting members further comprise guide members configured to guide the exhaust gas in the exhaust gas inflow passages toward the partition walls, the guide members extending from the porous coat layers inward of the exhaust gas inflow passages and also toward inlets of the exhaust gas inflow passages.

9. The exhaust purification filter according to claim 7, wherein the promoting members further comprise orifices arranged at inlets of the exhaust gas inflow passages.

10. The exhaust purification filter according to claim 1, wherein a permeability of the partition walls to the exhaust gas is lower in the fine zone than in the rough zone.

* * * * *